N. K. BOWMAN.
CABLE SPLICE.
APPLICATION FILED OCT. 4, 1915. RENEWED DEC. 5, 1917.
1,271,842.
Patented July 9, 1918.
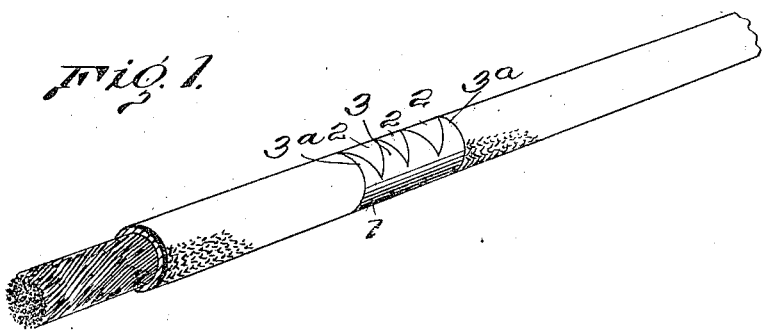
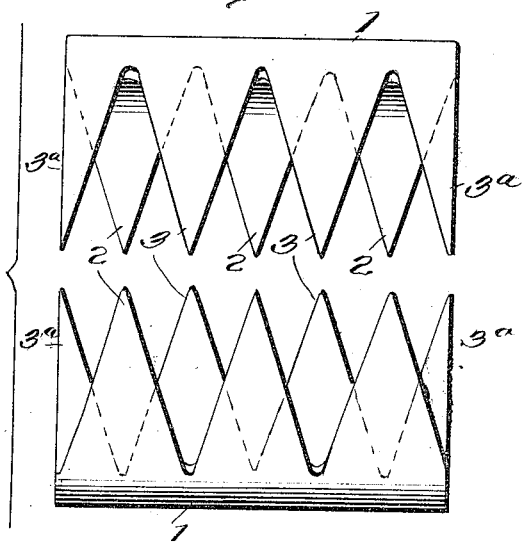
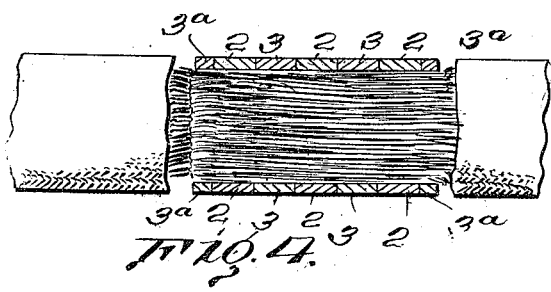
Inventor
N. K. Bowman
By
Attorneys.

UNITED STATES PATENT OFFICE.

NEWTON K. BOWMAN, OF CANTON, OHIO.

CABLE-SPLICE.

1,271,842. Specification of Letters Patent. Patented July 9, 1918.

Application filed October 4, 1915, Serial No. 54,015. Renewed December 5, 1917. Serial No. 205,670.

*To all whom it may concern:*

Be it known that I, NEWTON K. BOWMAN, a citizen of the United States, residing at Canton, in the county of Stark and State of Ohio, have invented certain new and useful Improvements in Cable-Splices, of which the following is a specification.

The chief purpose of the present invention is the provision of a novel connector for splicing cables or like parts to be coupled.

In the operation of mines utilizing gathering motors, cables are employed for conducting the current from a convenient source of supply to the motor so that the latter may operate in places where the current is not usually provided.

The electric conducting cable frequently becomes severed from one cause or another, usually by the passing of a truck wheel thereover, and it becomes necessary to splice such cable in a manner to prevent interference of the splice with the smooth and ready winding of the cable upon the spool.

The present invention provides means for splicing a cable so as to provide a substantial joint, and one which will not offer any obstruction to the smooth winding of the cable upon the spool, the splice being of such formation as to be readily and conveniently applied and which will hold the parts securely and not retard the passage of the current.

With these and other objects in view, which will readily appear as the nature of the invention is better understood, the same consists in the improved construction and novel arrangement and combination of parts which will be hereinafter fully described and particularly claimed.

In the accompanying drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings,—

Figure 1 is a perspective view of a length of cable embodying parts which are connected by means of a splice embodying the invention;

Fig. 2 is an enlarged plan view of the halves or sections comprising the splice, the parts being separated;

Fig. 3 is a perspective view of one of the halves or sections of the splice showing the same on a scale differeing from Figs. 1 and 2;

Fig. 4 is a longitudinal section of a joint embodying the splice.

Corresponding and like parts are referred to in the following description and indicated in all the views of the drawings by the same reference characters.

The invention provides a splice embodying a plurality of sections which when assembled are adapted to encircle the parts forming the joint, each of the sections being formed along opposite edges with spurs, the spurs at the edge of one section matching and intermeshing with the spurs at the adjacent edge of the next section, the spurs being of such length as to insure a firm gripping of the cable at the joint to retain the sections in position. In the preferable construction the splice comprises like halves which are provided at their edges with long tapering spurs, such spurs being separated by V-shaped indentations of corresponding outline with the spurs, so that when the halves or two sections are assembled the spurs of one section match and fill the indentations of the opposite half or section, thereby providing a connector which completely incloses the joint or the parts to be coupled. The connector or splice is preferably formed of metal which is compressible or bendable, thereby admitting of the halves or sections being compressed or clenched when in position upon the parts of the cable or like part to be coupled.

Referring more particularly to Fig. 2 of the drawings the numeral 1 designates two like sections or halves of a splice or connector embodying the invention. These sections are preferably formed of sheet metal of proper gage, being struck or stamped therefrom. Each of the sections or halves is of substantially U-shape in end view, as indicated in Fig. 3. A plurality of spurs or long tapering projections are formed along opposite edges of each of the halves or sections. An even number of spurs is provided at one edge of a section and an uneven number is formed at the opposite edge of the same section. For the sake of illustration three spurs 2 are located at one edge of a section and four spurs 3 are disposed at the opposite edge of the same section. The intermediate spurs 3 correspond to the spurs 2 but the terminal spurs $3^a$ are half the width of the spurs 3. This construction is essential in order to provide a splice having square ends, the spurs 3ª filling the spaces exterior to the terminal spurs 2 so as to provide a splice of uniform length and having square ends. The spaces or indentations between adjacent spurs correspond in outline to the tapering form of the spurs so that the latter come close together along their edges when the splice is in position. The distance between the extremities of the spurs at opposite edges of a section or half when the same is flattened is greater than one-half the circumference of the cable or part to be connected and such distance is usually about three-fourths the length of the circumference of the joint to enable the halves or sections to firmly embrace and grip the parts forming the joint. Slight spaces exist between the matching spurs which provide for a gripping action of the splice to firmly hold the parts coupled by the connector. It is for this reason that a connector or splice embodying a plurality of sections is enabled to grip more firmly than a splice comprising a single part only. The long tapering spurs result in an extent of joint spaces between the spurs which enable the parts of the cable to be gripped in a manner to resist tensile strain of great stress.

The sections or halves comprising the splice are usually formed of heavy sheet or plate metal, such sections or halves being initially flat but having a U-shape imparted thereto in the marketable form whereby a splice may be quickly and conveniently applied and the spurs clenched or compressed, thereby firmly gripping the parts of the cable to be connected and at the same time holding the parts of the splice in position. When a cable is to be spliced a portion of the insulation is removed from the ends to be connected and the strands are interlaced after which the splice is applied and the matching spurs clenched thereby forming a joint corresponding approximately to the diameter of the cable. It is to be understood that the splice is to be covered in any manner to guard against accident. Usually a length of tire tape is wrapped about the splice to form an insulating cover.

Having thus described the invention, what is claimed as new is:—

1. A splice comprising a plurality of compressible sections for encircling the part to be coupled, each of the sections having spurs along opposite edges, the spurs at the edge of one section intermeshing with the spurs at the adjacent edge of the next section.

2. A splice comprising a plurality of like compressible sections adapted to encircle the parts to be connected, each section having spurs along opposite edges, the spurs at adjacent edges interdigitated to completely inclose the joint.

3. A splice comprising two like halves of compressible or bending material adapted to encircle the parts to be joined, each half having relatively long tapering spurs along opposite edges separated by like tapering indentations, the terminal spurs at one edge being substantially half the width of the remaining spurs and the spurs being disposed to interdigitate when the halves of the splice are assembled.

In testimony whereof I affix my signature.

NEWTON K. BOWMAN. [L. S.]